United States Patent
Stogel et al.

(10) Patent No.: US 7,698,437 B2
(45) Date of Patent: Apr. 13, 2010

(54) METHOD AND APPARATUS FOR MULTIPLE AUDIO CONNECTIONS OVER NETWORKS

(75) Inventors: Scott Stogel, Westport, CT (US); Jonathan Niedfeldt, Highland, UT (US)

(73) Assignee: Digital Acoustics L.L.C., Lake Forest, IL (US)

( * ) Notice: Subject to any disclaimer, the term of this patent is extended or adjusted under 35 U.S.C. 154(b) by 0 days.

(21) Appl. No.: 11/333,227

(22) Filed: Jan. 18, 2006

(65) Prior Publication Data

US 2007/0168468 A1    Jul. 19, 2007

(51) Int. Cl.
G06F 15/16 (2006.01)
H04L 12/16 (2006.01)

(52) U.S. Cl. .................. 709/227; 370/389; 370/260

(58) Field of Classification Search .......... 370/478, 370/260, 337, 35, 355, 351, 311, 389; 713/322; 455/3.05, 466, 426.2, 458, 518; 379/35; 709/227

See application file for complete search history.

(56) References Cited

U.S. PATENT DOCUMENTS

| | | | |
|---|---|---|---|
| 5,650,999 | A | 7/1997 | Dickson |
| 5,983,192 | A | 11/1999 | Botzko et al. |
| 6,449,269 | B1 | 9/2002 | Edholm |
| 6,937,712 | B2 | 8/2005 | Lemchen et al. |
| 6,993,669 | B2 * | 1/2006 | Sherburne, Jr. ............. 713/322 |
| 7,020,102 | B2 * | 3/2006 | Tuomainen et al. ......... 370/311 |
| 7,120,388 | B2 * | 10/2006 | Hall ........................... 455/3.05 |
| 7,403,995 | B2 * | 7/2008 | Mace et al. ................. 709/227 |
| 2002/0055364 | A1 * | 5/2002 | Wang et al. ................. 455/466 |
| 2002/0062365 | A1 | 5/2002 | Nishikawa et al. |
| 2002/0141394 | A1 | 10/2002 | Hardisty |
| 2003/0190026 | A1 | 10/2003 | Lemchen et al. |
| 2003/0219035 | A1 * | 11/2003 | Schmidt ...................... 370/478 |
| 2004/0146031 | A1 * | 7/2004 | Jukarainen ................... 370/337 |
| 2004/0162095 | A1 * | 8/2004 | Edwards et al. ............. 455/518 |
| 2005/0048992 | A1 * | 3/2005 | Wu et al. ..................... 455/466 |
| 2005/0074031 | A1 | 4/2005 | Sunstrum |
| 2005/0111629 | A1 * | 5/2005 | Carlson et al. ................ 379/35 |
| 2005/0141529 | A1 | 6/2005 | Miyajima et al. |
| 2005/0282541 | A1 * | 12/2005 | Iizuka et al. ............. 455/426.2 |
| 2006/0056386 | A1 * | 3/2006 | Stogel ......................... 370/351 |
| 2006/0099972 | A1 * | 5/2006 | Nair et al. ................... 455/458 |
| 2007/0019571 | A1 * | 1/2007 | Stogel ......................... 370/260 |
| 2007/0064684 | A1 * | 3/2007 | Kottilingal ................... 370/355 |

(Continued)

FOREIGN PATENT DOCUMENTS

WO    WO0239315    5/2002

OTHER PUBLICATIONS

International Search Report for International application No. PCT/US06/01383, Sep. 18, 2006, Patent Cooperation Treaty.

(Continued)

*Primary Examiner*—Jungwon Chang
(74) *Attorney, Agent, or Firm*—Morrison & Foerster LLP

(57) ABSTRACT

A communication terminal, communication method and communication system is particularly suited for audio communications and applications such as an intercom. Multiple communication terminals may reside on a network and idle in a server mode. When communications are initiated in response to a trigger by switching a communication terminal from a server mode to a client mode, the client addresses another communication terminal and requests service in the form of a connection. The system, method and terminals may operate using TCP/IP protocol.

4 Claims, 14 Drawing Sheets

U.S. PATENT DOCUMENTS

2006/0087993 A1    4/2006    Sengupta et al.
2006/0090021 A1    4/2006    Weidig

OTHER PUBLICATIONS

International Searching Authority, Written Opinion of the International Searching Authority for International application No. PCT/US06/01383, Sep. 18, 2006, Patent Cooperation Treaty.

NCH Swift Sound, "Office Intercom Audio Communication Software".

Barix AG, Annuncicom IC User Manual Versions 01.01, 2004.

NCH Swift Sound, "Office Intercom Audio Communication Software", Feb. 19, 2006.

* cited by examiner

METHOD AND APPARATUS FOR MULTIPLE AUDIO CONNECTIONS OVER NETWORKS

BACKGROUND

1. Field of Invention

The invention relates to an audio communication system and more particularly to a means of establishing a connection between audio communications devices, such as telephones, intercoms or other audio communication terminals, connected together using TCP/IP connections. The invention relates to TCP/IP Client-Server network connection pairs where the connection pairs of a plurality of devices is managed to provide multiple combinations.

2. Description of Related Technology

Audio communication over Ethernet and Internet connections are known. They are implemented in VoIP telephony and communications equipment, music distribution, paging and remote audio monitoring. VoIP communications traditionally requires SIP/H323 management for establishment of a paired connection. The requirement includes encryption (TLS/SSL) that may require processor power of ARM or DSP processors running at over 10 MIPS and a 'name server' database to provide connection information.

Client-Server TCP/IP connections are also known and provide a single paired connection for data transfer. Client-Server describes the relationship between two processors with TCP/IP programming in which one processor, the client, issues a service request to another processor program, the server, which fulfills the request.

SUMMARY OF THE INVENTION

The invention described herein is a method and apparatus for establishing an audio communication session utilizing Internet Protocol where the connection, once established, provides a means for audio exchanges. At the termination of the audio session the network connection may be closed to enable a condition for subsequent network connections and audio sessions.

According to the invention an audio communication terminal, or multiple terminals in a system, may be connected to a network. Each terminal may idle in a server mode. In one embodiment, when a user desires to initiate communication, the user may actuate a trigger such as a switch or dialing mechanism. The trigger causes the terminal to switch from a server mode to client mode. In client mode the terminal may issue a connection request to a remote destination terminal. Once the client terminal is connected to the remote terminal, communications such as audio or data communication are possible. Such communications may be half-duplex "intercom" style or any other applicable communication method.

By utilizing the disclosed system a nearly unlimited amount of connection pair combinations may be established, each based on sets of Client-Server pairs without the requirement of SIP/H323 or database name servers. This provides a system with wide interconnection combinations without requirements of a specially programmed computer server or a specialized "head-end" system often used to manage such connections. Device connections may be made without the requirement of common voIP techniques such as SIP (Session Initiated Protocol), Jabber/XMPP and H.323 gateways, but rather, may connect using the described flexible paired Client-Server connection techniques. The invention's novel process provides advancements for scalable implementations, cost reduction, worldwide communications and ease of setup and use.

One specific advantage is that processing power, and associated costs, may be reduced to operational speeds of 5 MIPS and processors incorporating 8 bit microcontroller technology.

In addition, the invention's unique connection technique makes available call connection information in a network with a WAN firewall that might block SIP/H323 session initialization.

In a preferred embodiment the audio device used for connections, referred to herein as an "audio communication terminal" may contain a processor with associated memory, a TCP/IP protocol stack, a codec and a means of generating audio signals. The audio communication terminals may incorporate switch closures for initiating talk, connect and disconnect states, a plurality of switches for selecting the desired connection, indicators and displays. The audio communication terminal may also incorporate transducers in the form of a microphone, speaker or handset, or a means of creating audio signals with stored memory. The audio communication terminals may be in a physical form resembling an intercom, telephone, or incorporated as part of a network "appliance."

Network connections described may be over local LAN networks or span alternate networks for connections anywhere in the world. A preferred embodiment is envisioned to be low cost, simple to operate, easy to configure and scalable from a single pair to pluralities of audio communication terminals, each with the possibility of connecting to any other.

An advantageous feature envisioned may provide for connection sequences to establish connections to one of any number of programmed "fail-forward" audio devices. The address of these fail-forward IP addresses is stored in local memory and offers optional emergency and transfer "busy" IP address destinations.

Additional features are envisioned, such that for unanswered calls the destination IP addresses may include selective routing based on a set of rules for call routing. The rules may incorporate personal proximity detection, machine status settings (away messages), times of day rules or inactivity timers. The selective routing information may be in the initial DNS routine or subsequent connect attempts. Such connections may work with or without an external registration server.

According to an advantageous feature of the invention, session initialization, setup, teardown as well as actual audio/data transport may be handled with a single protocol. This is different from known systems such as Skype, AIM Google Voice and VoIP phones. Advantageously, the method according to the invention may support unlimited numbers of devices, each capable of initiating a sequence to establish a network connection, directly to the destination device (i.e., just via network switches vs. another PC/Server) and via a single protocol (vs. an intermediate protocol, like H323, SIP or Translators). This offers the capability of using stored audio data for audio information transfers following a connection, such as security, news, information or promotional announcements, i.e., can be used to transfer both pre-recorded or microphone audio.

The audio connection device, according to the invention, may optionally exhibit the following features and/or advantages.

Does not require external computing service for address database management.

Secure and private storage of IP addresses providing means of connections without identifying PP information to intermediate services, allowing creation of a VPIN (Virtual Private Intercom Network).

Deployment advantage of operating entirely within a WAN firewall environment (within a single subnet).

Cost saving advantage of complete system ownership and freeing the requirements for server based X509 or other security certificate ownership.

Initiate connections automatically, manually or on a timed basis.

Operate with half duplex or full duplex audio in handset and hands-free modes, or be configured to act as a device capable of only receiving or transmitting audio.

Use known or proprietary conversion techniques for audio exchanges over the network.

Provide methods other than TCP/IP for exchanging data, such as UDP broadcast protocol.

Provide interoperability with Jabber and XMPP protocols.

Provide a means to use memory lists to disallow connections.

Provide a means to determine status of available stations without using SIP/H3232 encryption.

Provide a means of storing a call log and providing levels of connection security.

Provide capability for remote update via flash memory from a computer on the network.

Provide a means for routing alternate IP addresses, effectively offering call forwarding operations.

Provide ability to transmit and receive stored and real time streaming audio and messages.

DETAILED DESCRIPTION OF THE PREFERRED EMBODIMENT

Figure 1:
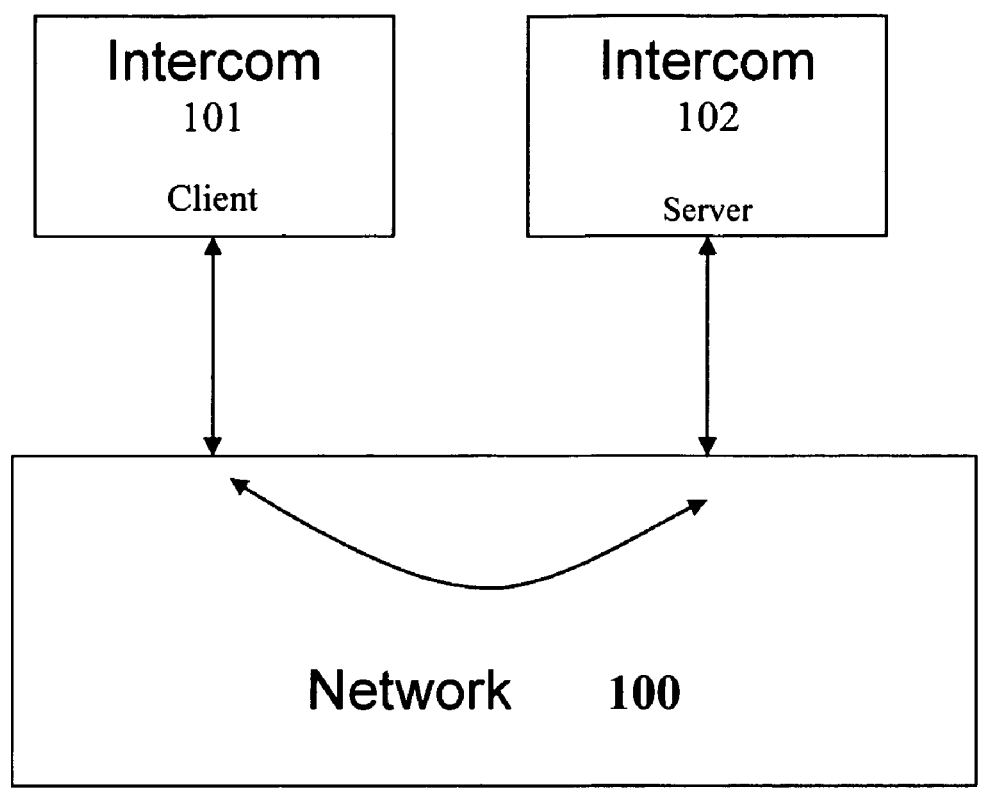
FIG. 1 shows a schematic interconnection of in two audio communication terminal devices, connected on a network.
Figure 2A:
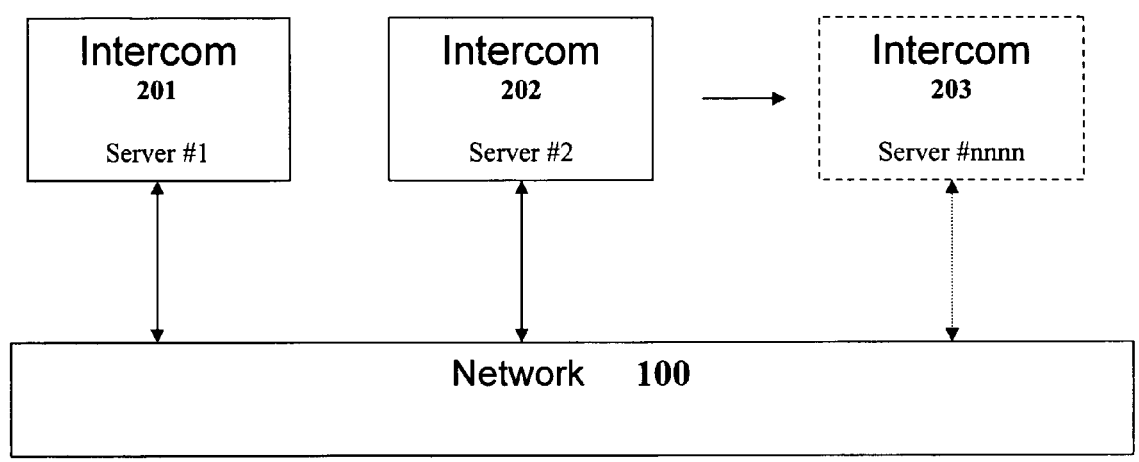
FIG. 2A details a plurality of similar devices, connected in a means according to the invention, shown in Idle/Standby modes.
Figure 2B:
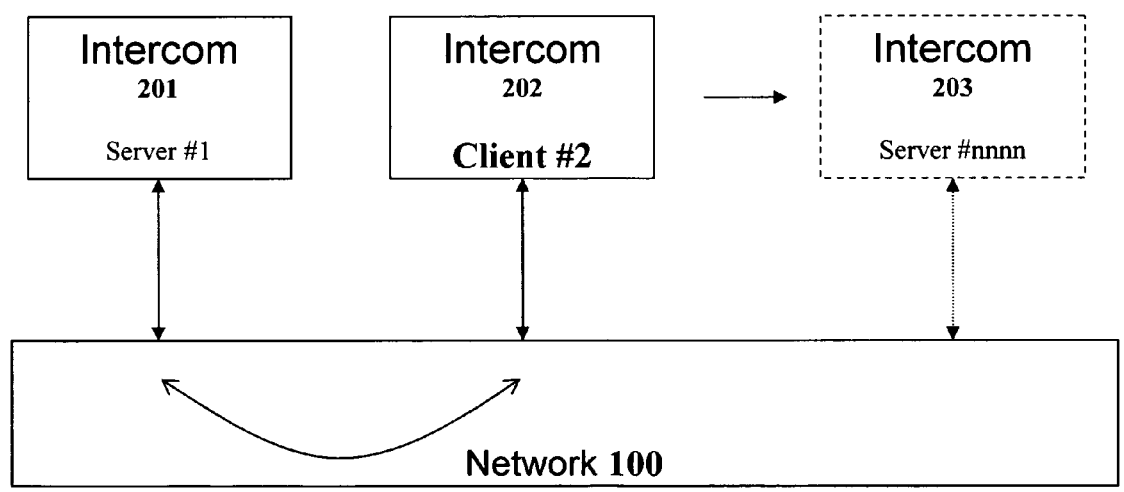
FIG. 2B shows the devices according to FIG. 2A, after a paired connection.
Figure 3:
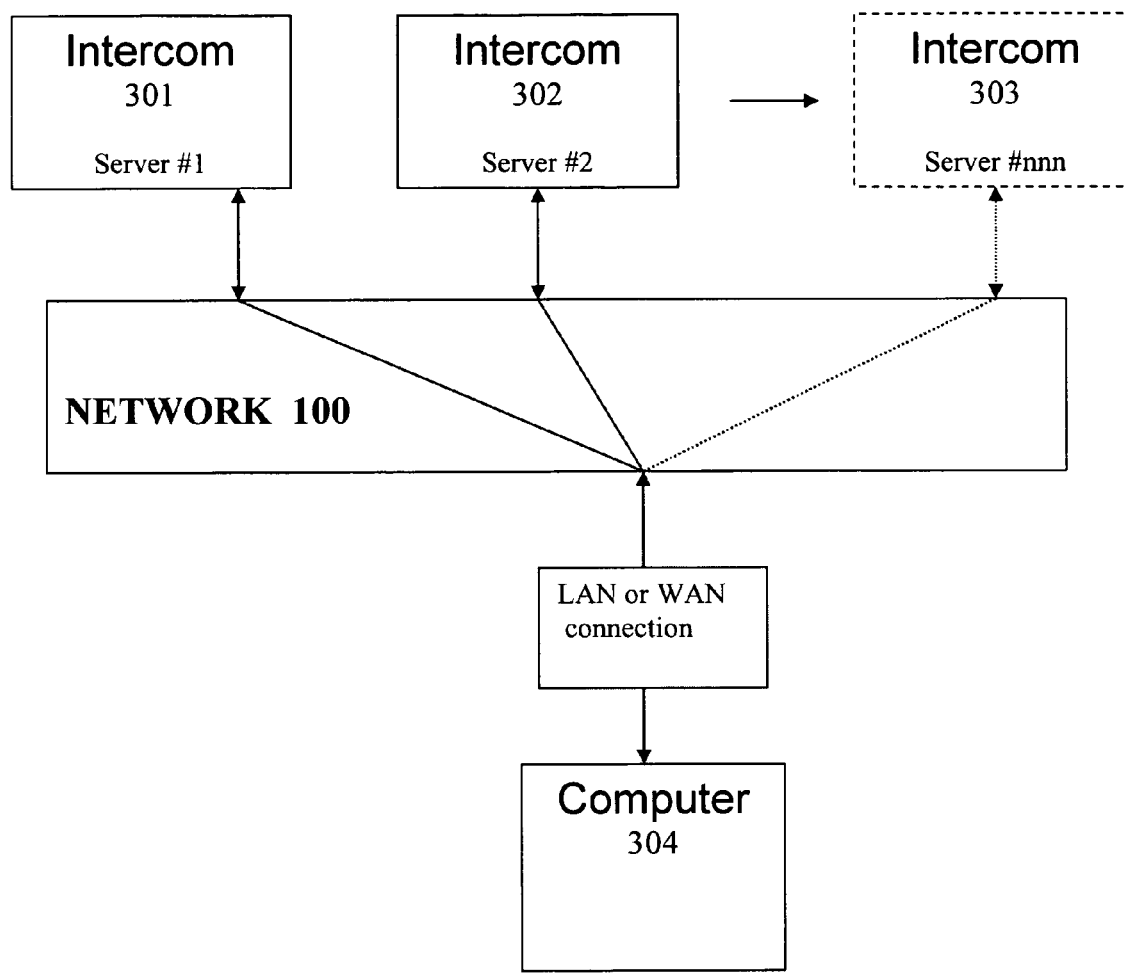
FIG. 3 shows plurality of similar hardware devices and a computer with communications management software connected to a network.
Figure 4A:
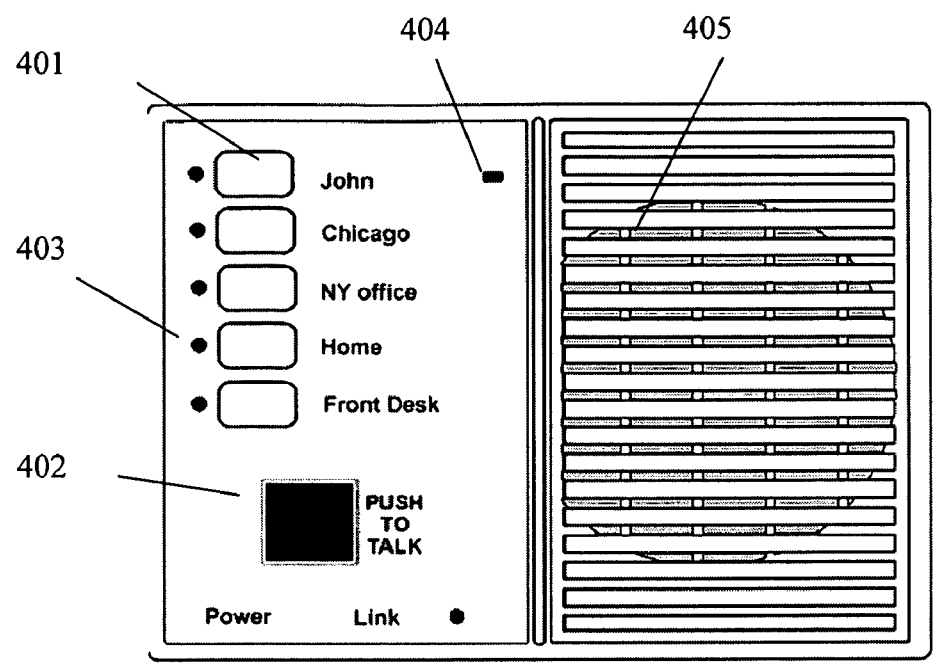
FIG. 4 shows embodiments of an audio communication terminal device according to the invention.
Figure 4B:
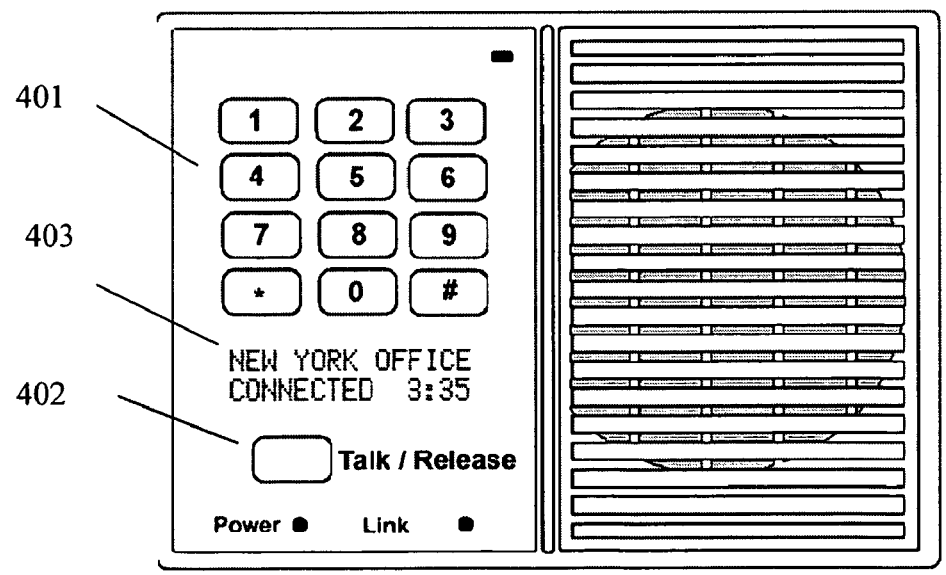
Figure 5:
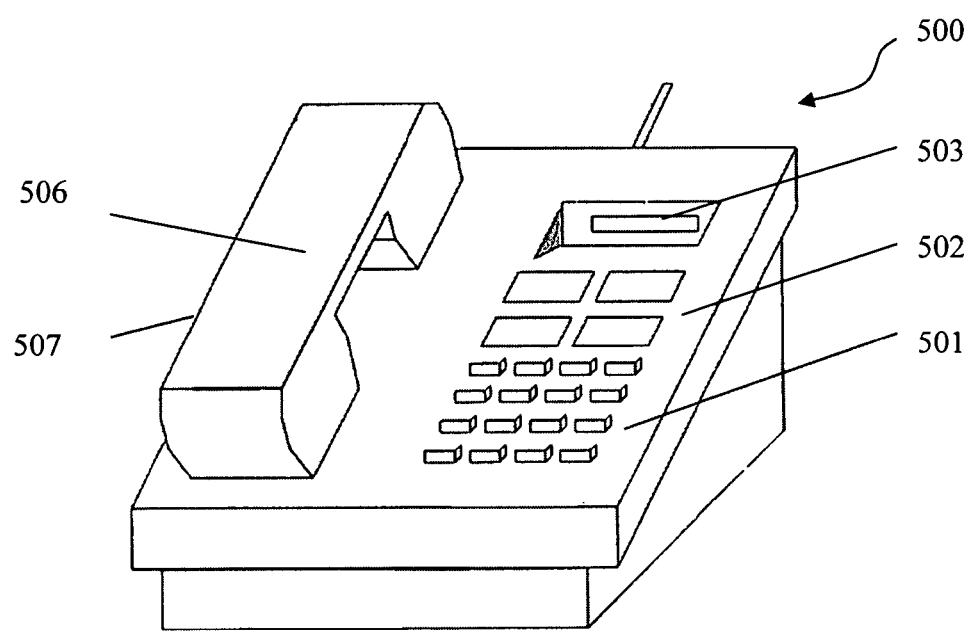
FIG. 5 shows an alternate embodiment of an audio device, according to the invention.

FIGS. 1-3 show a block of IP enabled apparatus (audio communication terminals), such as those shown in FIGS. 4 and 5, each with their own IP address, static or assigned by a Dynamic Host Configuration Protocol ("DHCP.") DHCP is an internet protocol for automating the configuration of computers that use TCP/IP. DHCP can be used to automatically assign IP addresses to deliver TCP/IP stack configurations and provide other configuration information. Also shown is a connection on a Network (100) that may be a local LAN or WAN network, Internet network, wireless network or combination of these networks over a large distance. The audio communication terminals shown all contain at least a unique identifier, such as a MAC ID, and an individual IP address in the commonly known format #.#.#.# (ex 192.168.0.100) stored in memory (618). These numbers may be in memory, assigned by the operator during a setup configuration, or may be assigned by the network on initialization (DHCP Assignment).

FIG. 1 shows a representation of traditionally TCP paired connection such that one audio communication terminal (101) would be set as a client and another (102) would be set as a Server Listener via memory flags set in memory 618. On power up initialization the Client (101) would request a connection to the known IP address of audio communication terminal 102, set as a Server listening for such a request. Connection would occur when the Server 102 receives and accepts the client's request. Once connected, data transfer is available at any time and audio communication may be exchanged. Connection may continue permanently or until power loss or failure.

In the mode described in FIG. 1, the connection and, therefore, communication, on any one audio communication terminal is limited to the mated counterpart audio communication terminal in the pair.

FIGS. 2A and 2B show a configuration whereby audio communication terminals are programmed according to the invention for multiple, paired communications expanded over a plurality of audio communication terminals. Audio communication terminals 201 and 202 are detailed, with the last audio communication terminal of an array indicated by 203. Such an array could extend into thousands of units, limited only by network capabilities to create and handle the expanding connections. Audio communication terminals of FIG. 2A are shown in idle mode. In the idle mode all audio communication terminals are maintained in the Server mode waiting for a connect request from a Client. Devices in the Server mode are often referred to as TCP "listeners."

According to the invention any audio communication terminal may call (contact and connect) to a server utilizing a novel means of seamless re-configuration to act as a TCP client seeking the desired server listener address. Such a method provides virtually unlimited connection combinations, without the requirement of NameServers, SIP protocol overhead or hardware switchers normally associated with a such distributed system infrastructure.

The connection example, FIG. 2B, shows a configuration during a communication session. The process for initiating a contact (or call) from audio communication terminal 202 may be invoked by activation of one or more local triggers. In a described embodiment, depression of the Talk button (402) FIGS. 4A and 4B on terminal 400, and 502, on terminal 500 (FIGS. 5) respectively may be embodiments of audio communication terminal 202 would invoke the trigger, invoking the invention's process of instantly re-configuring the audio communication terminal from Server to a Client, loading required network addressing from memory, seeking and subsequently connecting to another audio communication terminal (201 in this example). This effectively enables the condition shown in FIG. 1 of a TCP/IP Client-Server pair connection. Such a process is known to work within a period fast enough to be transparent to the users and produce a seamless "instant connection." The connection may be to any desired, available server audio communication terminal on the network, provided the originating audio communication terminal has the server address programmed in memory according to the invention.

A timeout period following release of the talk switch, or a "release key" event or a hook-switch closure would terminate the TCP/IP connection and return the audio communication terminal (202) from Client back to Server mode (809), restoring it back to an idle/standby. The idle state would permit audio communication terminal 202 to be available (as a server) to receive calls from any other audio communication terminal in the array, or again call out to another known audio communication terminal in the array as a client.

Additional switches (401,501) may be incorporated to refer to arrays of network address information providing ability to connect to a plurality of desired audio communication terminals. Switches may be in the form of dedicated speed-dial keys, or fixed and programmable keypad arrays. The address arrays may include IP Addresses and Port numbers to be used in the TCP connection request as described in FIG. 2 and information such as names and locations.

Audio communication terminal address arrays may be programmed into audio communication terminal memory (616) by various means.

Figure 6:
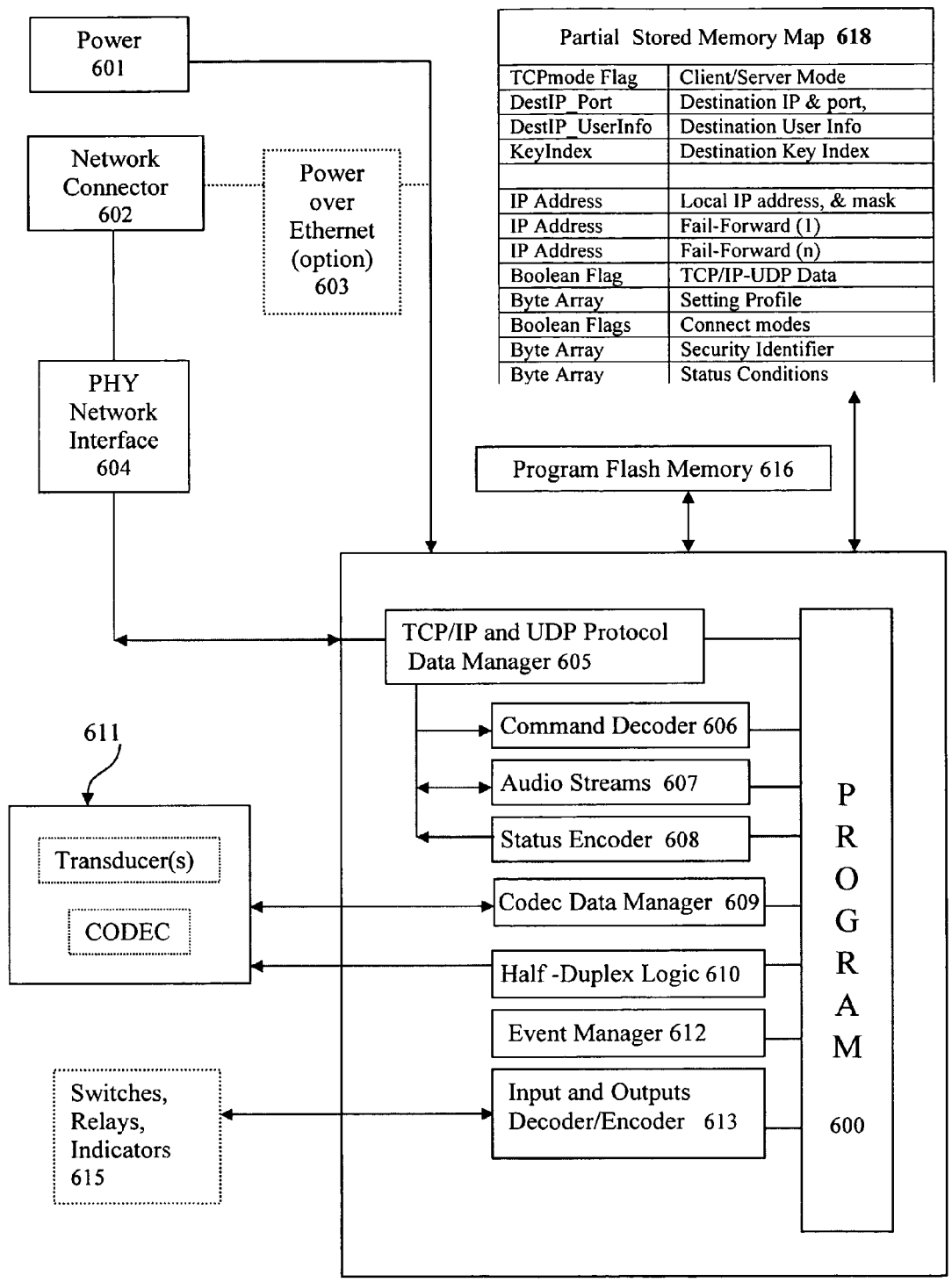
FIG. 6 shows a block diagram of an embodiment of electronics, according to the invention.

FIG. 3 shows means whereby a computer (304) running a supporting application may be set to program a plurality of audio communication terminals 301-303. UDP broadcasts originating from the computer may request audio communication terminals to reply with their individual network identifiers containing their unique MAC IDs, IP and port numbers, and useful identifications. Subsequent network transmissions from the computer may individually or globally program audio communication terminals in the system with configuration information such as programmable key assignments, address directories and operating feature options. Alternate configuration methods, such as means for manual programming and configuring audio communication terminals to seek destination servers with known addresses and exchanging programming information may also be available within the processor operating system (FIG. 6).

In the event that an audio communication terminal may not be able to establish a requested connection with a preferred audio communication terminal, it may advantageously attempt a connection to another audio communication terminal according to a pre-programmed or interactive protocol. Such a fail-connection system is envisioned to be useful for security and emergency communications.

In a preferred embodiment the apparatus may be entirely housed in an audio communication terminal enclosure (400) or styled in the form of a Telephone (500) with means of power (not shown) and network connection, such as an RJ45 jack (also not illustrated). These connections might enter the enclosures via rear or side connection jacks.

FIGS. 4A and 4B describe an audio communication terminal with common elements shown in the drawing of FIG. 5, styled as a telephone. The description of FIGS. 4A/4B could apply to corresponding elements of the telephone (500) with available engineering and fabrication techniques.

FIG. 4 contains switches (401,402), display information (403), and audio transducers (404,405). The visual indicators (403) may be LEDs or an alphanumeric display indicating condition states and useful user information. The microphone (404) and speaker (405) may be used as transducers for transmitting voice, playing received audio and providing audible indications. In alternate embodiments the microphone may be eliminated in favor of bi-directional transducers, audio data saved in memory, or housed in the form of a handset (506). The Talk Button shown (402) may provide a local PTT (Push To Talk) signal to enable transmission of audio in the form of a trigger signal to the processor. The functionality of the talk button may be expanded to provide Talk/Release capability for terminating a call. A handset (506) with integrated hook-switch (507) may also be used to incorporate audio and automatic Talk/Release capabilities.

The enclosure houses the electronic assembly schematically shown in FIG. 6, incorporating power management, a network interface, a processor, a Codec, a transducer, controls and indicators.

The network connection (602) described may be a standard design such as a RJ45 housing with 10/100 mb magnetic isolation, connected to a PHY interface IC, such as a RealTek 8201BL (604). Other network connections (not shown) may include higher speed networks, wireless 802.11b, Bluetooth, Optical and Power-Line solutions that are all capable of transporting data using TCP/IP protocol. A Power connection (601) is shown to provide the required DC power. Optional methods for Power over Ethernet (PoE) (603) may be employed to deliver required power, without a dedicated power connection 601, when incorporated with the Network wiring connections (602).

As an advantageous feature of the invention, the electronics for implementation may not require extensive DSP processing power. A processor (600) such as Atmel 8052 with 64 KB Flash Memory and 2 K of RAM and W3100 Network ASIC can be employed. 25 MHZ devices have been chosen and provide sufficient speed to exchange audio data in Client-Server network connections.

The programming of the processor 600 may contain algorithms to handle multiple basic functions:

TCP/IP and UDP data manager (605) may be used to store TCP/IP connection states and manage packet for reception and transmission in the form of a TCP/IP "Stack." A key element used in this management is the connection mode attempted. The audio communication terminal may be configured as TCP/IP Client or TCP/IP Server, both of which are required to make a valid "Connection" whereby data and digital audio may be transferred. The data manager (Client or Server) mode may be controlled by a memory logic flag, "Client/Server Mode" in memory (618).

Data from the TCP/IP and UDP data manager 605 may be transferred via a method that includes commands listed in Table 1. Other command functions and methods are possible. Audio data may be incorporated between or contain commands when transferred serially in real time. Video or other data may also be transferred in versions envisioned.

TABLE 1

| Sample Packet Stream | | | | |
|---|---|---|---|---|
| cmd-code | <value> Optional | cmd-code | Audio stream PCM | cmd-code |

| Sample Command Codes | | |
|---|---|---|
| Name | Value | Description |
| Cmd_PICFLASH | 10 | Program flash memory |
| Cmd_TXcode_0 | 11 | Tell audio communication terminal to play audio |
| Cmd_TXcode_1 | 12 | audio communication terminal play off |

TABLE 1-continued

| | | |
|---|---|---|
| Cmd_NVWRITE | 13 | Write a value to the audio communication terminal memory |
| Cmd_PING | 14 | Ping the audio communication terminal |
| Cmd_ListenON | 15 | Set audio communication terminal to baby monitor |
| Cmd_PagingON | 16 | Set broadcast paging mode |
| Cmd_SET_SW_CFG | 17 | Send switch config byte set port config |
| Cmd_SET_LED_STATE | 18 | Set led state, byte |
| Cmd_SET_TONE | 19 | Generate TONE FREQ, MSB (*255) |
| Cmd_FRIENDLYNAME | 21 | Set is the Friendly Name Text |
| Cmd_CONNECT_SERVER_MODE | 73 | Set Server Mode |
| Cmd_CONNECT_CLIENT_MODE | 74 | Set Client Mode |
| Cmd_CONNECT_FAIL | 75 | Not connected |
| Cmd_DHCP_FAIL | 76 | Connect to the DHCP host |
| Cmd_READ_ST_CFG | 86 | Send status byte set |
| Cmd_MICON | 87 | audio communication terminal microphone depressed |
| Cmd_MICOFF | 88 | audio communication terminal microphone un-pressed |
| Cmd_SEND_MAC_ADDR | 89 | Send the MAC address |
| Cmd_FRIENDLYNAME | 90 | Send the Friendly Name |

The Command Decoder (606) parses incoming data for remote instructions that may include commands to raise or lower a volume in the Codec (609), control an input or output logic (613) or remotely control keystrokes (613), effectively controlling the audio communication terminal from a network signal. It may also hold cryptographic keys, flash memory programming codes and subsequent data stream information that may be used for remote servicing and data security. Advantageously, the arriving data may be accepted in a form such as UDP data packet, and may contain command information, memory programming information and/or an audio packet stream. In such cases the decoder (606) may manage the data by detection, setting or the memory flag TCP/IP-UDP in memory (618) and timing the decoding of incoming UDP packets decoding as needed. UDP transfers may be used to exchange data information prior to Client-Server paired connection, for system setup and configuration as well as audio content distribution, such as group paging.

The Command Encoder (608) may advantageously create formatted code commands that, when transmitted, send signaling information to the remote network devices. This can be a signal to control status and operating states of other devices on the network.

The Audio Stream section (607) manages software based conversion and compression techniques such as PCM, uLaw or GSM compression, tone generation, voice activated transmission control (VOX level detection), echo cancellation and encryption/decoding security algorithms applied to the audio stream itself.

General Purpose Input-Output (GPIO) controls (613) may be used to manage hardware lines (ports on the processor) to control and sense switches relays, sensors and indicators. GPIO states may be exchanged on the network for any purpose, including control of real time events, the audio communication terminal user interface, security and remote control.

The processor capabilities may support echo-cancellation techniques (such as G.168) such that Full-Duplex exchanges of audio are possible. Advantageously Half-Duplex audio may be implemented on the processor configured to allow 2-way communication via Push-to-Talk, wherein each party in a paired communication may either listen or speak at alternating intervals. The process provides simple connection mechanism such as (Push to Talk) or hands-free (speakerphone) style communication while maximizing the available bandwidth on the network by having a single audio stream transferring at any point in time (to or from the apparatus). This operational method also prevents acoustic feedback eliminating the need for computing intensive echo-canceling processes.

The logic management may optionally be used to tell the Audio Stream Manager (607) to generate a beep at the end of the audio transmission, effectively informing the remote human operator the audio channel is free and they may reply by voice. This is an operational mode, using beeps, that is commonly used in walkie-talkie communications.

Figure 7:
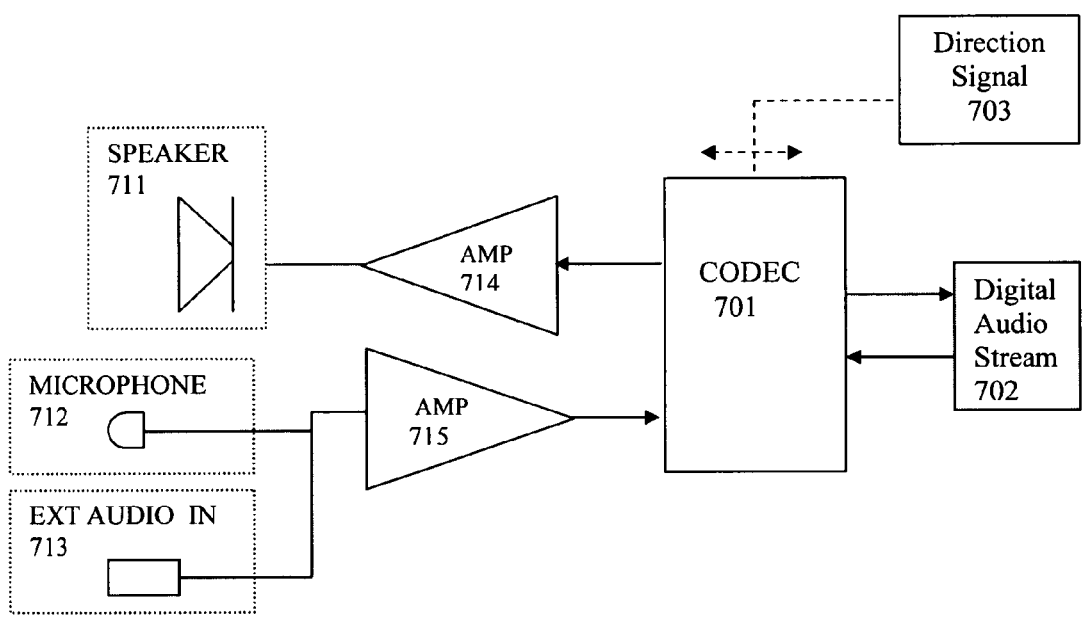
FIG. 7 shows a half-duplex audio sub-system comprising a microphone and speaker.

FIG. 7 details exchanging audio information with the processor in Half Duplex modes. Elements may be a microphone/WM54 (712), speaker/CUI-GA0666 (711), IC power amplifier (714) (ex: National Semi LM5431) and Microphone Pre-Amp (such as AD SS2121) (715) combined to interface to a Codec (701) such as Winbond 692510. In addition, the system may be provided with an external input (713). Such blocks as shown are also available in either more discreet or more highly integrated implementations, all used to convert Analog and Digital signals. Alternate transducers available, but not shown, may include 'bullhorn' speakers and parabolic microphones, or a microphone and ear element combined in telephone style handset. Additionally audio signals connected to the Codec may be generated from external input signals such as audio data stored in memory or real-time audio sources such as Internet. In this manner a call to an audio communication terminal might generate a return recorded audio signal such as "I am not available now," or generate announcements from a real time 'live' source. Half-Duplex and voice controlled duplexing (VOX) may be digitally controlled via signals 610 and 703.

Audio connections between audio communication terminal pairs (as shown in FIGS. 1-3), according to the invention, are TCP Client-Server connections. Data may also be exchanged in an unconnected mode, such as UDP broadcast data. In the case of UDP broadcast data, the audio communication terminal processor (600) may parse data to decode commands and audio data information. In UDP reception the audio communication terminal data manager may act on commands as needed and request additional data such as programming mode packets or broadcasted audio data streams.

Establishing connections requires a connection request to be sent from the client and be received by the TCP/IP manager (605) in the server. The processor then checks to see if the audio communication terminal memory flag (in memory 618) has been set for listening and may accept the request. If so, the pair exchanges additional TCP data, completing the connection. Once connected a Connect flag is set in memory to steer the processor operation accordingly.

Processor 600 of the intercom or audio communication device or terminal may run coded programming routines to manage data, control audio communication terminal operation, process audio and manage configuration and memory updates. The routines of the processor that support the methods of the inventions are described in FIGS. 8-14.

Primary routines of the processor may be cyclical after power-up and system initialization. Prior to entering the main loop, system initialization may set memory states, visual displays, test network conditions and initialize the audio communication terminal to Idle Mode as shown in FIG. 2A.

Figure 8:
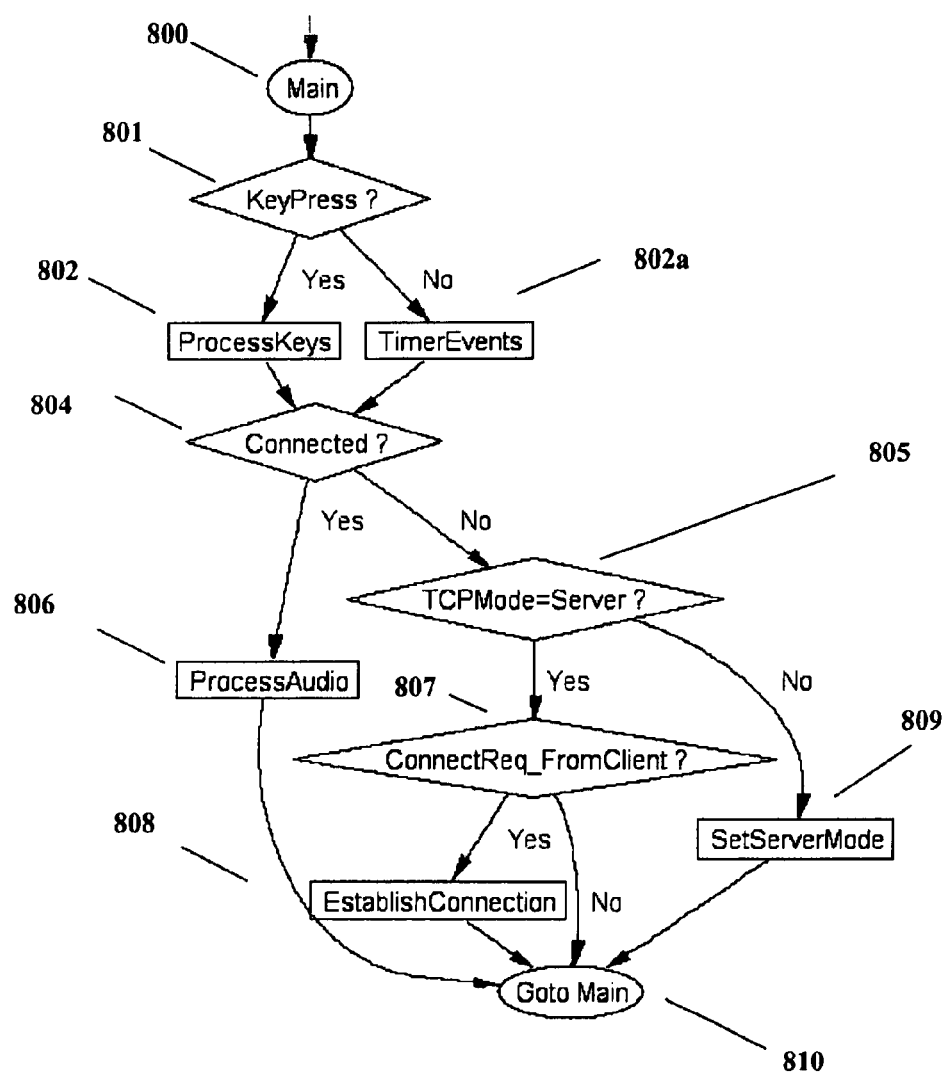
FIGS. 8-14 show flowcharts of methods according to an embodiment of the invention.

FIG. 8 outlines the states of the Main Loop (800), which may begin by examining keypress conditions. At power-up or upon a Re-set, the system may be initialized by setting various flags. At power-up a keypress may invoke special system setting, however normally a keypress (801) is not detected and a subsequent TimerEvent (802) will not have triggered. If a keypress is detected at 801, it is processed accordingly at 802. If no keypress is detected, timer events are processed at 802a. The audio communication terminal would have been initialized to be Not Connected and set in operating mode TCPmode=Server. In this condition, and if a TCP/IP remote connect request has not been received, the process returns to the Main Loop, returning to 800. If a remote connection request has been detected at 807, a connection request may be established 808, and the process is returned to the beginning of the main loop 800. If at 804, the TCP Mode is not set to Server, the Server Mode flag may be reset, 809 and control is returned to the main loop 800. If a connection is detected at 804 the system then processes audio at 806 prior to returning to the main loop 800. This loop process is effectively Idle Mode, shown in FIG. 2A.

Details of the main loop illustrated in FIG. 8 are further described in FIGS. 9-14.

Figure 9:
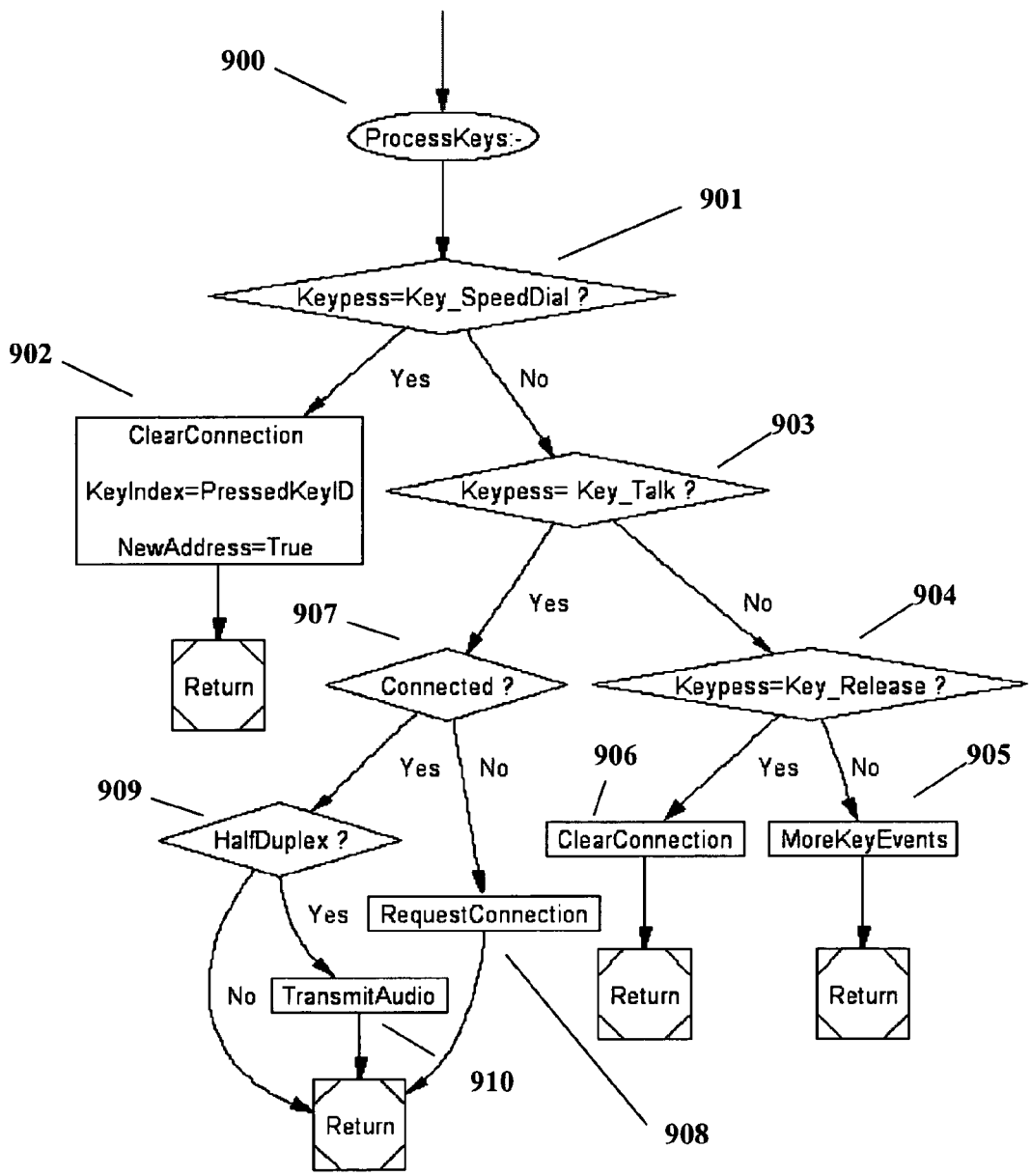

One embodiment of the ProcessKeys routine 802 is described in FIG. 9. An apparatus of the invention (audio communication terminal) may provide a means of specifying a desired connection, such as a speed-dial key set (901). If depressed, existing connections are terminated, the index of the button is stored, and a flag is set to indicate that a selection has occurred (902).

Other actuator events, such as a depression of a Talk (903), or lifting of a handset may initiate a sequence that would test for a connection (907) and then begin a new connection sequence, RequestConnection (908).

In the special case of HalfDuplex connection (909), the Talk switch may be used during a connection to invoke audio transmission (910).

Key depressions such as Release (904) may terminate a network connection (906) and additional keypresses, and sensors (905) may provide means for changing operation modes and programming. At the conclusion of the routine, control is passed back to the main loop.

Figure 10:
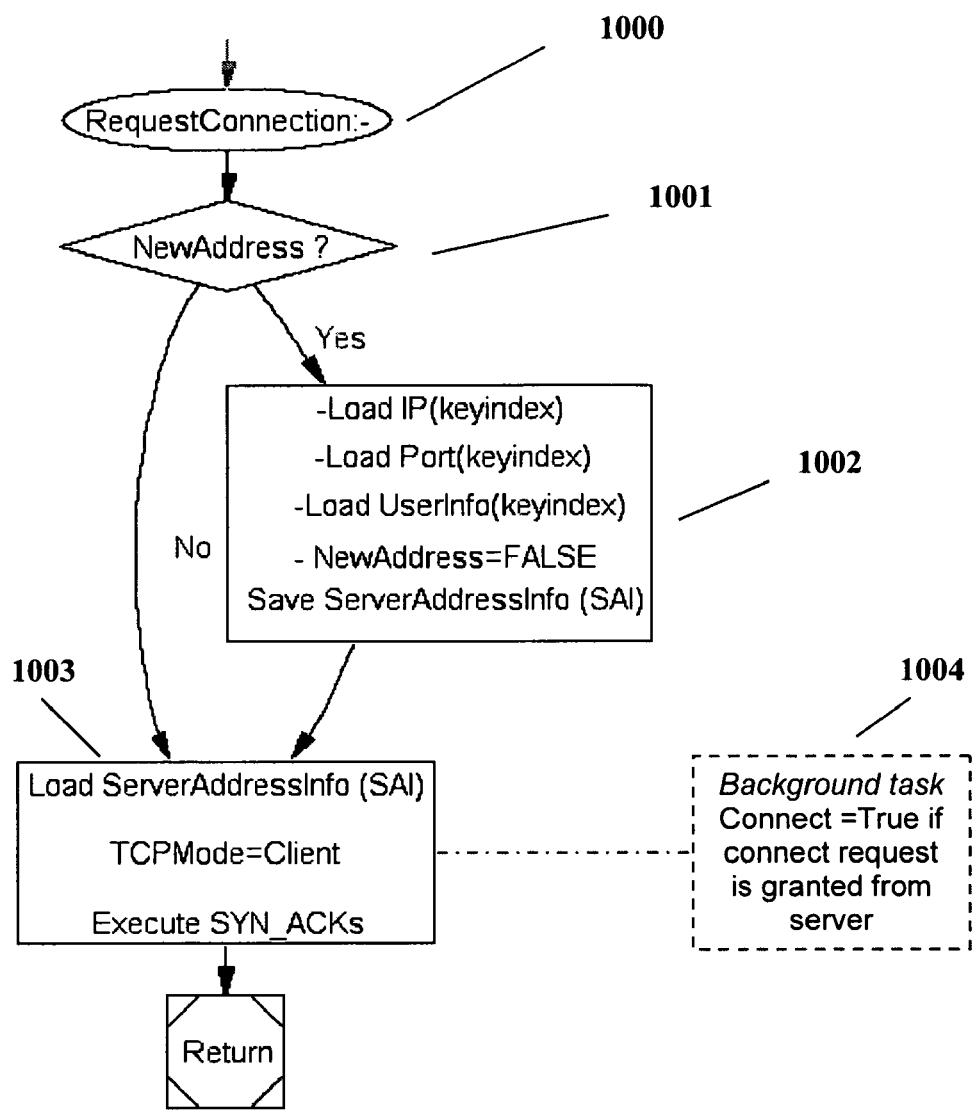

FIG. 10 expands on the RequestConnection process (908) for beginning a call. When invoked, the process (1000) would examine if a previous connection address is to be used, or be replaced with a new address (1001). A NewAddress sequence (1002) would load a data array holding address information, save the information as an active address, and clear memory flags such as NewAddress to prevent re-entry. This information would contain "Server Address Information" (SAI) and may contain an IP address, Port Number, Subnet Mask, MAC ID, and text to facilitate the actual connection request (1003). The SAI may also be saved providing means for a single TALK command to attempt a subsequent connection to the called audio communication terminal, equivalent to a telephone 'Recall' function.

TCP/IP Connection Request follows standard TCP/IP protocol to request a connection. As specified in the invention the processor must set the Server-Client flag to Client Mode. Such a client mode would require a destination server network address, and would be loaded with the Server Address Information (SAI). Information for a connection request may then be passed to the network in TCP/IP SYN-ACK protocols (1003) to wait for the designated Server to establish a connection. A background task (1004) would set 'Connected'=True when the Request is acknowledged, and a connection is established, or otherwise time-out to indicate unavailable or busy states via audio communication terminal indicators.

Figure 11:
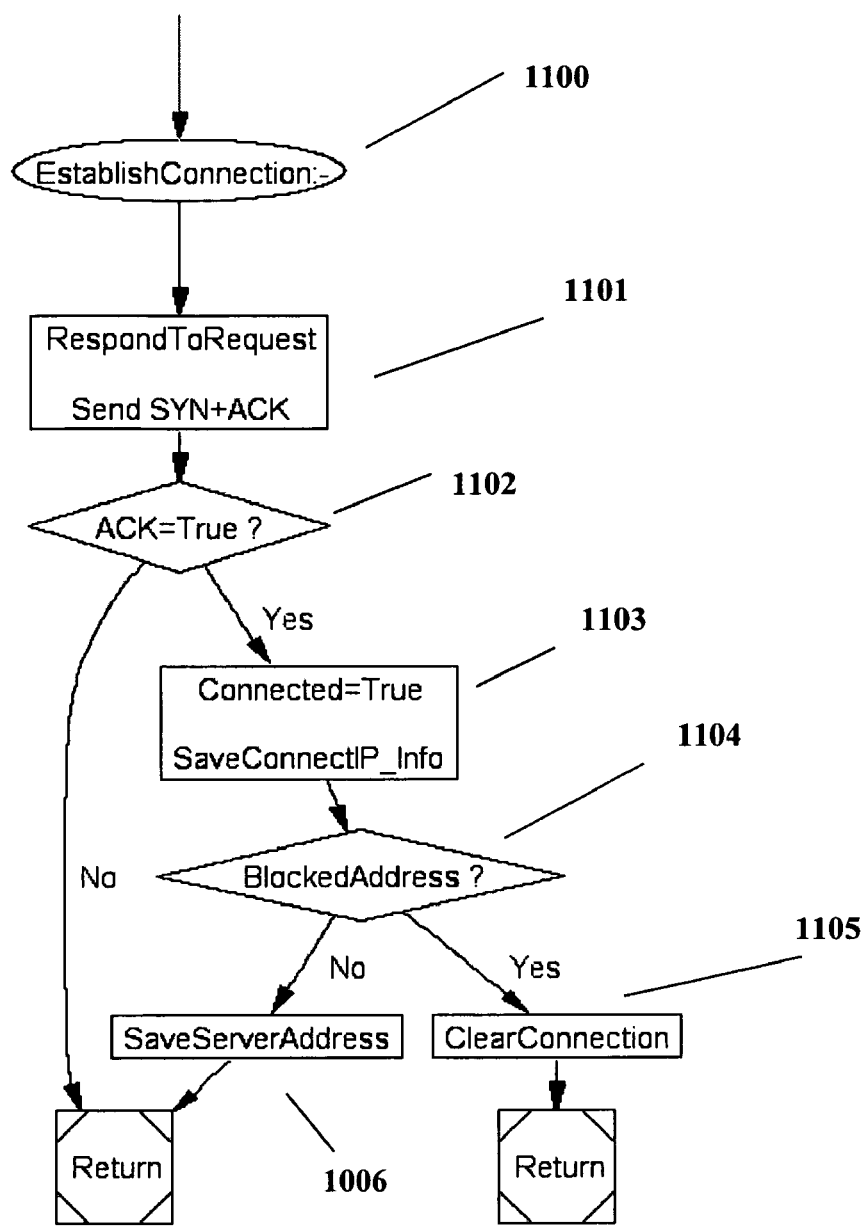

To complete a paired connection, another audio communication terminal, in Server (idle) Mode according to the invention, would be testing for connection requests (807) and, if received, would process a request to Establish a Connection (808), further described in FIG. 11 (1100).

FIG. 11 shows a TCP/IP connection process of an audio communication terminal receiving a client's incoming connect request. Inbound frames of data to a server containing identification information are parsed and responded to by the specific target (TCP 'ACK') (1101). Subsequent return ACKs validate a handshake whereby a Client-Server connection state exists (1102). Both audio communication terminals would set their respective flags Connected=True. Advantageously the audio communication terminal may provide security algorithms and means of rejecting connection requests (1104). All connection events of both Server and Client events may be logged for functions equivalent to a "Caller ID" log and history.

Figure 12:
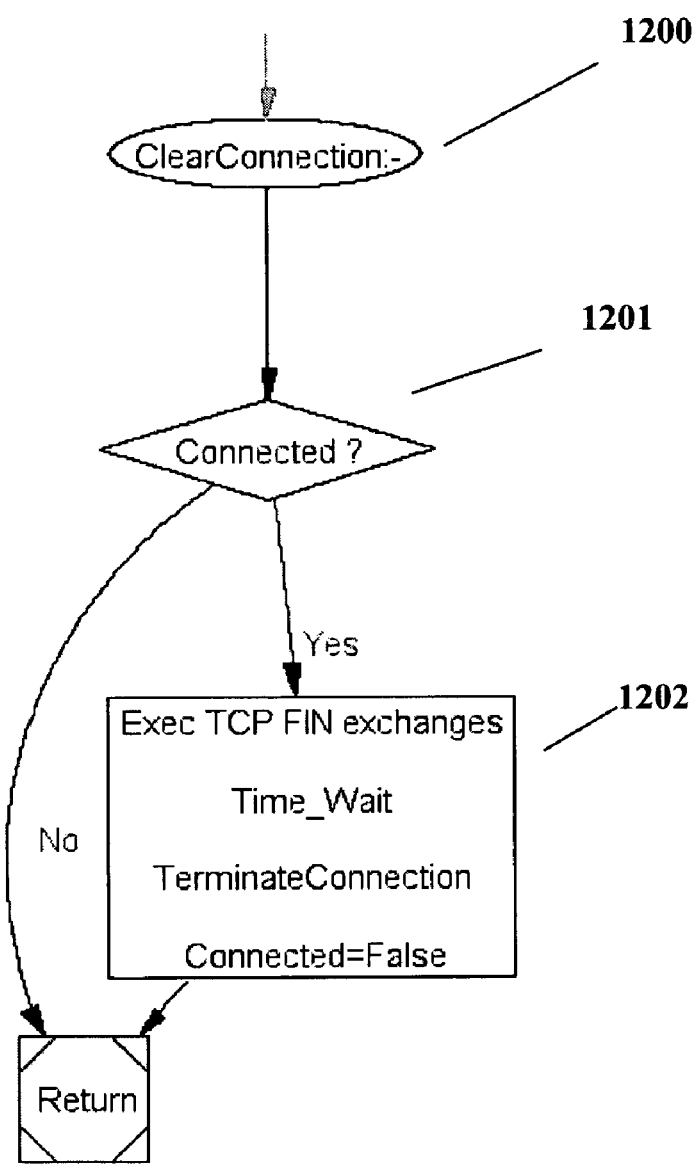
Figure 13:
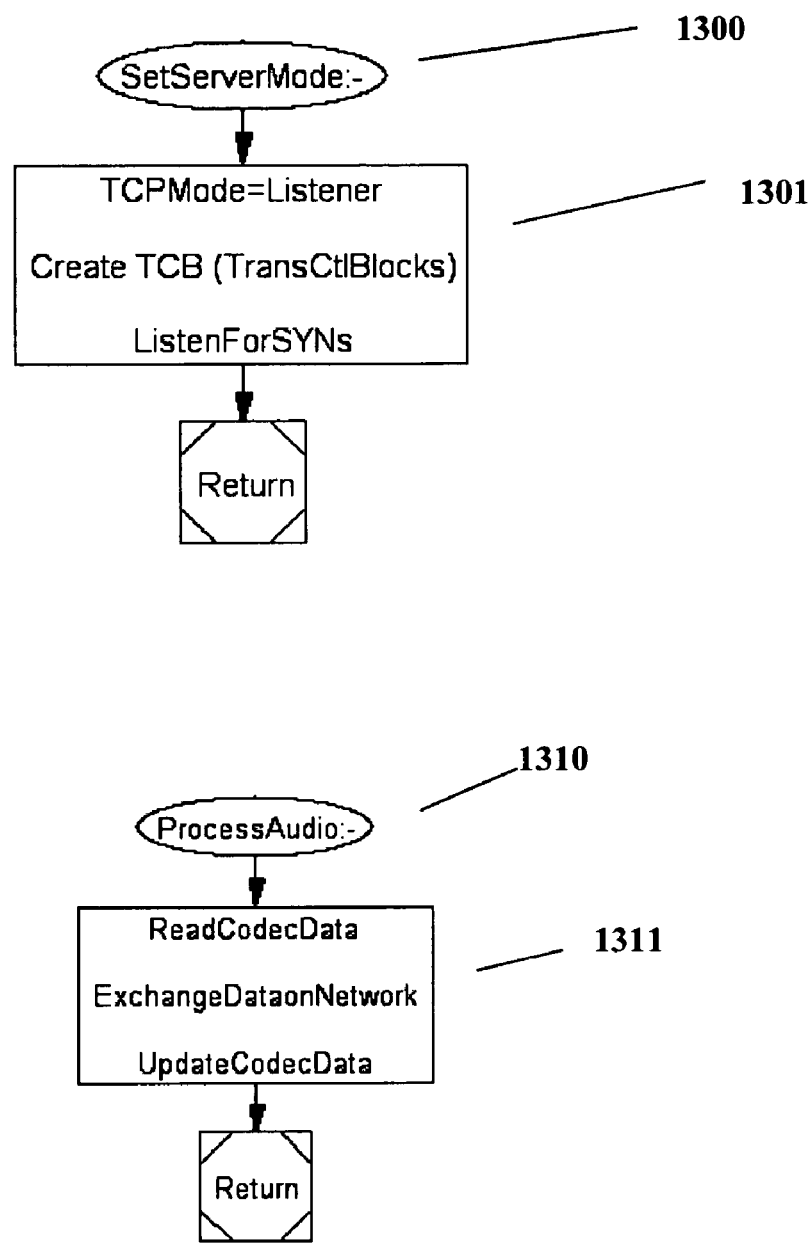

Once a connection is established, according to the Main flow routine, audio processing 806 may transfer audio between audio communication terminals as further described in FIG. 13. The process of exchanging data on the network (1311) has been outlined previously for Half-Duplex and Full-Duplex exchanges. Successfully established connections permitting audio exchanges may invoke memory storage of the network addresses information of the incoming client (1006) and a means for transfer to the SAI memory, for a single TALK command to reestablish connection with the last connected audio communication terminal, equivalent to a telephone 'Recall' function. Advantageously this information may further update integrated audio communication terminal address directories for later use. Blocked connections would trigger a universal routine, ClearConnection (1105) further described in FIG. 12.

FIG. 12 describes the process for terminating a current TCP/IP connection initiated at (1200). This routine is used for disconnecting "blocked" audio communication terminals (1104), in response to a Release sequences (904), and in TimerEvents (802). If a connection is active (1201) a TCP/IP 'FIN' exchange triggers the client and server pair to terminate their connections. Timeouts (1202) provide further insurance that failed exchanges will ultimately result in a terminated connection. When the Connected state becomes False, the Main routine 801 would subsequently restore the Client audio communication terminal back to a Server state in idle mode in process SetServerMode (809) and further described in FIG. 13. At termination the Call Logs may also be updated to provide connect times and other useful information. According to the invention, idle mode would then provide a means for additional paired communications, initiated from any audio communication terminal to any other audio communication terminal.

FIG. 13 describes the detail of the SetServerMode routine. In the sequence (1300) the processor sets the TCP/IP Stack to Server mode (a TCP listener), creates the required Transmit Control Blocks and sets the processor to listen for network SYNs requesting a new connection.

Figure 14:
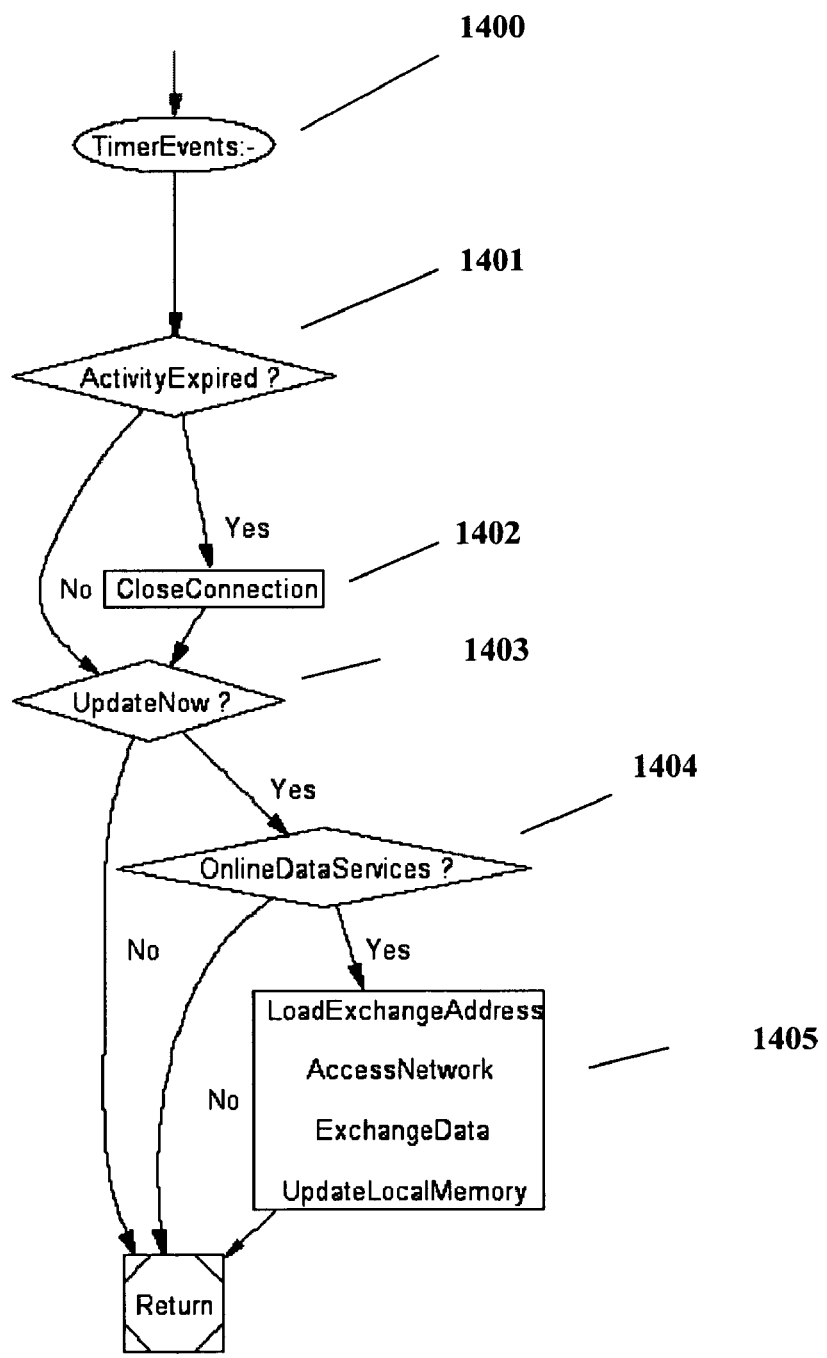

FIG. 14 outlines details of TimerEvents shown in the Main routine (802). The timer may have sets of intervals ranging from counts of processor cycles to minutes. The TimerEvent detail described in FIG. 14 shows two such intervals (1401, 1403) and for clarity does not show traditional and envisioned timer events of at least keyboard scans, display updates and memory flag housekeeping.

ActivityExpired Timer event (1401) provides a means of terminating a network connection (1402) when audio data or actuator timers indicate the call is complete. For example, in the described Half-Duplex embodiment this can be the absence of audio exchanges for some period of time.

The UpdateNow timer event (1403) may be set to invoke automatic access data exchanges to a network for system wide connection status and updated audio communication terminal array information. If the process is enabled (1404), and the audio communication terminal is available for data exchange, the audio communication terminal may update local displays with system information and report its current availability to other audio communication terminals or a computer on the network. Such a connection is possible with UDP exchanges, or TCP data transfers to a network device with a known network address (or ???). Advantageously, this would provide the capability for HTTP setup and status updates via a web enabled interface.

The process described is not limited to the preferred hardware and the processor may be enabled with additional capabilities to provide compatibility with SIP H.323 and other protocols. The invention has been described with reference to a specific exemplary embodiment thereof Various modifications and changes may be made thereto without departing from the broad spirit and scope of the invention. The specification and drawings are to be regarded in an illustrative rather than a restrictive sense and the invention is limited only by the claims.

What is claimed is:

1. A communication method comprising the steps of:
    setting an audio communication terminal to a network server mode state;
    switching said audio communication terminal to a client mode state in response to a trigger correlated with an IP address of a remote communication terminal;
    establishing a network connection between said audio communication terminal and said remote communication terminal at a known IP address upon switching said audio communication terminal to said client mode state;
    transmitting data from said audio communication terminal to said remote communication terminal; and
    wherein said step of setting sets said audio communication terminal to a stand-by TCP/IP network server mode;
    said step of switching switches said audio communication terminal to a TCP/IP client mode state; and
    said network connection is a TCP/IP connection.

2. A communication method according to claim 1 wherein said remote communication terminal is an audio communication terminal.

3. A communication method according to claim 2 further comprising the steps of:
    converting audio input at said audio communication terminal to data; and
    converting said data to audio output at said remote communication terminal.

4. A communication method according to claim 1 further comprising the steps of terminating the network connection and re-setting said communication terminal to a TCP/IP network server mode state upon termination of a connection.

* * * * *